Patented July 2, 1929.

1,718,955

UNITED STATES PATENT OFFICE.

DOUGLAS M. HARRISON, OF EAST ST. LOUIS, ILLINOIS, ASSIGNOR, BY MESNE ASSIGNMENTS, TO McKENZIE MORTAR COMPANY, OF PITTSBURGH, PENNSYLVANIA.

LIME-HARDENING COMPOSITION AND PROCESS OF MAKING SAME.

No Drawing. Application filed April 13, 1925. Serial No. 22,910.

This invention relates to a composition for accelerating the set of lime products.

The chief object of the invention is to produce a hardener which has the property of setting up and hardening the lime products, although it does not quickly dry the same, such as plaster, stucco, mortar and the like, and in about a weeks time whereas the same hardness heretofore has been obtained only after two or three months time has elapsed if other and present commercial lime hardeners are employed.

The chief feature of the invention consists in the addition of powdered relatively inert material such as coal ash, shale or shale ash, calcium chloride or the like, or its equivalent, and in mixing therewith an activating agent, such as marcasite ($FeS_2$).

Furthermore, a water-proofing constituent may be added.

The resultant hardener is added to the lime product, that is, plaster, mortar, stucco and the like in the usual manner.

It is well known that lime products, such as plaster, mortar, stucco and the like, require a considerable drying time and a considerable time for hardening. This hardening is the result of the formation of calcium carbonate from the lime in the form of calcium oxide or calcium hydroxide, lime usually being slaked when mixed with the usual ingredients to form the aforesaid lime products. Charcoal burners are frequently utilized to dry and to harden interior lime construction.

Lime hardeners are commercially old, but the best hardeners at present commercially employed accelerate such hardening of the lime products so that the same can be said to be substantially dry in a period from two to three months, and to have acquired an initial hardening within a relatively short time, such as a week or ten days, which initial hardening is at least sufficient to permit the lime product to be further worked upon such as for finishing, painting and the like.

The present invention is directed to a hardening agent for the aforesaid lime products, which secures substantially the same degree of hardening heretofore obtained in from two to three months, within a week or approximately ten days time, and to secure a hardening within a day or less equivalent to the hardening heretofore obtained with other lime hardeners in a week or ten days time. The matter of drying the lime product is not as important as obtaining the quick hardening, for the latter permits working by the same plasterer without changing from job to job. In the following it is to be understood that any statement of proportions or amounts is to be considered as illustrative and not restrictive in character in any way whatsoever, unless specifically mentioned as a definite proportion in a claim or claims, for experimentation has determined that the proportions may be varied within relatively wide limits and give satisfactory service without serious or deleterious results in the finished lime products. Such proportions as are given, however, are based upon the utilization of one hundred pounds of lime or similar equivalent material, which is included in a mix which may be varied to suit or satisfy the particular requirement.

One of the chief ingredients of the hardening composition is a relatively inert material such as coal ash or a shale material, and this may be an oil shale either in pulverized form or in ash and pulverized form. Such a material derived from several sources is relatively cheap and when production of oil from oil shale is more commercially employed, the resultant shale ash will be available as a waste product. One shale which has been satisfactorily employed, is that known as the New Albany, found at New Albany, Indiana, and the following is an approximate analysis of a typical sample of ash therefrom, dried at 110° centigrade:

| | Per cent. |
|---|---|
| $SiO_2$ | 65.03 |
| $CaO$ | 1.26 |
| $Fe_2O_3$ | 14.84 |
| $Al_2O_3$ | 13.96 |
| $MgO$ | 1.32 |
| $P_2O_5$ | .08 |
| $SO_3$ | .22 |
| $TiO_2$ | 1.02 |
| $Na_2O$ | .91 |
| $K_2O$ | .72 |
| $Li_2O$ | .58 |
| Loss on ignition | 1.81 |
| | 99.75 |

Other oil shales, however, have been satisfactorily employed and may be substituted for the foregoing shale.

Another important ingredient in the hardening composition is a suitable iron-sulphur compound. Such suitable compounds are iron pyrites ($Fe_2S_3$) or marcasite ($FeS_2$), commonly called "brass ball" in coal mining practice. This material is reduced in size and is mixed with the shale and the chief ingredient. The foregoing material is hereinafter termed the activating agent and may be composed of either or both of the before mentioned or other suitable, iron sulphur compounds.

The chief ingredient is calcium chloride or any of its well known equivalents, that is, equivalents which include a water-absorbing and hardening property, without seriously effecting or producing objectionable characteristics in the resulting lime product.

As an example, and only by way of example, the following suggestive formulæ which have been experimented with and found satisfactory, are herewith included.

For every hundred pounds of lime or lime equivalents in a lime product mix, there may be included a hardener composed of approximately one pound of shale or shale ash and approximately four pounds of calcium chloride, or its equivalent. A second formula which has been very satisfactory, is one which includes three to four pounds of calcium chloride and two to one pound of marcasite. A third sample included approximately one pound of shale or shale ash, approximately one pound of marcasite and approximately three pounds of calcium chloride.

It has been determined that the third example mentioned produced the quickest hardening, and that shale ash was more satisfactory than shale. This may or may not be due to the fact that marcasite has an affinity for oil which the shale included, but which was burned out of the shale ash. The present invention however, contemplates the use of shale or shale ash and where satisfactory the use of marcasite or iron pyrites or mixtures of the same or their equivalents.

It has furthermore been determined that to every hundred pounds of the foregoing there may be added a water-proofing material in the form of specially prepared water-proofing compositions, or in the form of commercial water-proofing compositions now on the market, and the proportions of these may be varied as is well known in the art. For example, from one to ten pounds of the same may be added to every hundred pounds of lime or lime equivalent material but approximately two or three pounds of the water-proofing material seems to produce satisfactory water-proofing properties without seriously injuring the final lime product.

The before mentioned lime hardener, therefore, may be mixed with from one to ten pounds of water-proofing material although generally but two or three pounds of said material is included in the hardening compound thereby forming a hardening and water-proofing composition.

The invention, therefore, generically consists of a suitable shale material, an activating agent and a water absorbing agent.

The invention claimed is:

1. A composition for hardening commercial lime products such as plaster, mortar and stucco, including calcium oxide or calcium hydroxide or the like, said composition including a pulverized shale material including the ash content thereof, calcium chloride, and a comminuted iron sulphur compound including only iron and sulphur.

2. A composition as defined by claim 1, wherein the composition for approximately one hundred pounds of lime in the lime product includes the approximate proportions of one pound of shale material to at least three pounds of the calcium chloride.

3. A composition as defined by claim 1, wherein the composition for approximately one hundred pounds of lime in the lime product includes the approximate proportions of one pound of the iron sulphur compound to at least three pounds of calcium chloride.

4. A composition as defined by claim 1, wherein the composition for approximately one hundred pounds of lime in the lime product includes approximately one pound of shale material to at least three pounds of calcium chloride and one pound of iron sulphur compound.

In witness whereof, I have hereunto affixed my signature.

DOUGLAS M. HARRISON.